UNITED STATES PATENT OFFICE.

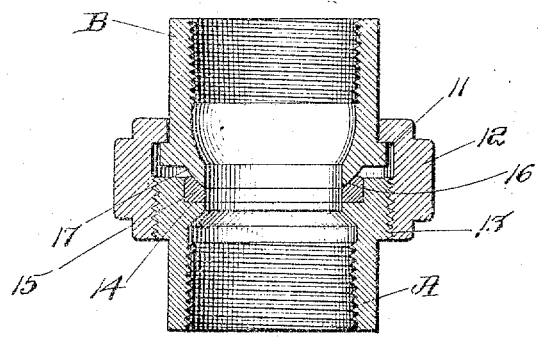
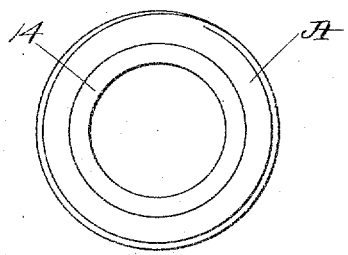
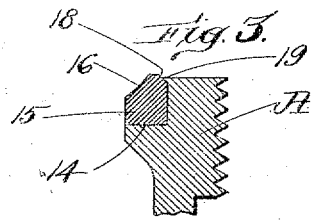

WILLIAM H. STODDARD, OF SOMERVILLE, MASSACHUSETTS.

UNION.

966,870.  Specification of Letters Patent.  Patented Aug. 9, 1910.

Application filed June 14, 1909. Serial No. 501,960.

*To all whom it may concern:*

Be it known that I, WILLIAM H. STODDARD, a citizen of the United States, residing at Somerville, county of Middlesex, State of Massachusetts, have invented a certain new and useful Improvement in Unions, of which the following is a specification, reference being had therein to the accompanying drawings.

My invention relates to that class of unions commonly known as brass-to-iron ball unions or ball joins. In unions of this character it is customary to construct the male and female end members of malleable iron or similar material and to interpose between the said end members a ring of brass or bronze which is somewhat softer than the malleable iron and which readily makes a tight joint, said two end members being connected by means as a collar adapted to compress the ring between the proximate portions of the two end members. In ball joints of this type a variety of difficulties have heretofore been experienced but one of the chief is the tendency of the ring to become loose owing to unequal expansion and contraction of the materials of which the members are composed so that the bronze ring becomes loosened and drops out. This is especially the case where the joint is used in railroad work.

My present invention has for its object to produce a joint which shall be as effective as the joints heretofore in use and which may be constructed at an expense which will permit its use in places where a cheap joint is required but in which the bronze ring will always remain in place and cannot be lost out. To make the joint steam tight I support the bronze ring on a flat seat in an annular recess in the end members and give the face of the ring which contacts with the other end member a slope of about 45 degrees so that the pressure upon the bronze ring tends to expand the ring slightly and seat it firmly against both of the adjacent walls of the annular recess in the end member in which the bronze ring is contained. To prevent the bronze ring becoming loose and falling out I chamfer the outside edge of the ring slightly and after the ring has been forced into place in the annular recess in the end member, I mold or work the metal of the end member which lies adjacent the chamfered edge of the bronze ring against and over the said chamfered edge so that it forms a small rigid flange and overlies the edge of the said bronze ring, thereby securing it firmly in place in such a manner that the ring cannot become loosened by the uneven contraction or expansion of the metals composing the joint. I find that this flange holds the bronze ring securely in place and that said bronze ring does not become loosened and cannot drop out.

The invention will be fully understood from the following description taken in connection with the accompanying drawings, and the novel features will be pointed out and clearly defined in the claims at the close of the specification.

In the drawings,—Figure 1 is a vertical section of the joint embodying my invention. Fig. 2 is a plan view of the member A. Fig. 3 is an enlarged sectional detail showing the flange by means of which the bronze ring is held in place.

In the embodiment shown in the drawings,—there is shown at A and B the two end members which are screw-threaded in the well known manner for connection with the sections of pipe. Said end members are often known as the male and female members. The male member B is provided with a flange 11 against which the collar 12 rests. Said collar 12 is also screw-threaded as shown at 13 and engages a correspondingly screw-threaded portion of the end member A. By this means the two end members are forcibly drawn together as required, although any other convenient means may of course be employed. The female member A is provided with an annular recess 14, the walls of which are at right angles with each other, and within this recess there is received a bronze ring 15 having a face 16 which is slightly curved in the well known manner usual in ball joints and in section appears to be at an angle of about 45 degrees as will be seen in Fig. 3.

The end member B is provided with a face 17 which is globular or ball shaped in form and is adapted to lie in contact with the face 16 of the bronze ring 15 being held forcibly in contact with the said bronze ring 15 by means of the pressure exerted by the collar 12 or other tightening means. The pressure exerted upon the bronze ring 15 by the end member B resolves itself into two components, one of which tends to crowd the bronze ring 15 against the horizontal surface of the annular recess of the member A and the other of which tends to crowd the bronze ring against the vertical surface of the annular recess so that a steam-tight joint is made between the bronze ring and both surfaces of the annular recess. The said bronze ring 15 is chamfered slightly on its upper outside edge as shown at 18 in Fig. 3. After the said bronze ring 15 is put in place in the annular recess in the female member A, the metal composing the upper face of the said female member A is worked over the chamfer 18 to form a flange 19 which holds the said ring 15 securely in place. This is readily accomplished by rolling the end surface of the female member A with a suitable tool in a manner well known to those skilled in the art.

I believe this process of constructing a joint by chamfering the ring and forming a flange by working the adjacent metal against the chamfer to be novel and accordingly I reserve to myself the right to make application for Letters Patent covering the same at some future date. The flange 19 thus produced is small but rigid and sufficient to hold the bronze ring 15 securely in place and positively prevent the bronze ring being jarred or lost out should it become loosened at all by the uneven expansion of the metals.

The joint embodying my present invention costs so much less to construct than any other brass-to-iron ball joint known to me that it extends the use of a brass-to-iron joint to a large variety of places in which it has been impossible to use them heretofore on account of the expense of these joints as heretofore constructed.

What I claim is:

1. In a ball joint the combination with two end members, one of which has an annular recess in the face next to the other of said members, a ring of relatively soft metal in said annular recess, said recessed end member having a minute flange extending inwardly over the adjacent outer edge of the said ring.

2. In a ball joint the combination with two end members, one of which has an annular recess in the face next to the other of said members, the walls of said annular recess being perpendicular to each other, of a ring of relatively soft metal in said annular recess, said recessed end member having a minute flange extending inwardly over the adjacent outer edge of the ring.

3. In a ball joint the combination with two end members, one of which has an annular recess in the face next to the other of said end members, a ring of relatively soft metal in said annular recess having a chamfered outer edge, said recessed end member having a flange extending inwardly over the chamfered edge of said ring.

4. In a ball joint the combination with two end members, one of which has an annular recess in the face next to the other of said end members, the walls of said annular recess being perpendicular to each other, of a ring of relatively soft metal in said annular recess having a chamfered outer edge, said recessed end member having a flange extending inwardly over the chamfered edge of said ring.

In testimony whereof I affix my signature, in presence of two witnesses.

WILLIAM H. STODDARD.

Witnesses:
 GEORGE P. DIKE.
 ALICE H. MORRISON.